United States Patent
Hsieh et al.

(10) Patent No.: US 10,452,460 B2
(45) Date of Patent: Oct. 22, 2019

(54) STORAGE SERVER SYSTEM CAPABLE OF SETTING OVERCURRENT PROTECTION VALUE ACCORDING TO SYSTEM CONFIGURATION

(71) Applicant: Wistron Corporation, New Taipei (TW)

(72) Inventors: Cheng-Kuang Hsieh, New Taipei (TW); Cheng-Yen Wu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 156 days.

(21) Appl. No.: 15/861,633

(22) Filed: Jan. 3, 2018

(65) Prior Publication Data
US 2019/0065295 A1 Feb. 28, 2019

(30) Foreign Application Priority Data
Aug. 31, 2017 (TW) .............................. 106129641 A

(51) Int. Cl.
*G06F 11/07* (2006.01)
*G06F 3/06* (2006.01)
*G06F 1/30* (2006.01)

(52) U.S. Cl.
CPC .............. *G06F 11/076* (2013.01); *G06F 1/30* (2013.01); *G06F 3/0625* (2013.01); *G06F 3/0634* (2013.01); *G06F 3/0688* (2013.01); *G06F 3/0689* (2013.01); *G06F 11/0709* (2013.01); *G06F 11/0727* (2013.01)

(58) Field of Classification Search
CPC ............ G06F 11/0727; G06F 11/0709; G06F 11/076; G06F 3/0625; G06F 3/0634; G06F 3/0688
See application file for complete search history.

(56) References Cited

U.S. PATENT DOCUMENTS

| | | | | |
|---|---|---|---|---|
| 4,672,501 A * | 6/1987 | Bilac | ...................... | H02H 3/0935 361/42 |
| 7,312,969 B2 * | 12/2007 | Matsumoto | .............. | F02D 41/20 361/87 |
| 8,854,782 B2 * | 10/2014 | Luo | ........................... | G06F 1/28 361/93.7 |
| 9,225,158 B2 * | 12/2015 | Kawamoto | .............. | H02H 3/08 |
| 10,305,310 B2 * | 5/2019 | Zhao | .................... | H01M 10/443 |
| 2012/0182661 A1 * | 7/2012 | Luo | ......................... | H02H 3/087 361/93.7 |
| 2013/0063850 A1 * | 3/2013 | Kawamoto | .............. | H02H 3/08 361/87 |

FOREIGN PATENT DOCUMENTS

| | | |
|---|---|---|
| CN | 103268144 A | 8/2013 |
| CN | 104572516 A | 4/2015 |
| TW | I567545 B | 1/2017 |

* cited by examiner

*Primary Examiner* — Nadeem Iqbal
(74) *Attorney, Agent, or Firm* — Winston Hsu

(57) ABSTRACT

A storage server system includes a storage module including at least one storage device for generating at least one present signal, a micro controller coupled to the storage module for generating a setting signal according to the at least one present signal and system information, and a tunable resistor coupled to the micro controller, wherein a resistance of the tunable resistor is corresponding to an over current protection value of the storage server system.

10 Claims, 4 Drawing Sheets

STORAGE SERVER SYSTEM CAPABLE OF SETTING OVERCURRENT PROTECTION VALUE ACCORDING TO SYSTEM CONFIGURATION

BACKGROUND OF THE INVENTION

1. Field of the Invention

The present invention relates to storage server system, and more particularly, to a storage server system capable of setting overcurrent protection value according to system configuration.

2. Description of the Prior Art

Open compute project (OCP) is an organization that shares hardware designs of large-scale data center, and aims at maximizing operational efficiency of the 1 large-scale data center to simplify system operations, improve system reliability, maintenance, energy efficiency as well as reduce power consumption. The OCP provides open sharing sources of hardware standards of the large-scale data center to facilitate industrial development, expand purchase of open rack, thereby reducing development cost for the large-scale data center.

For example, open compute project defines modular hardware standard for a storage server system. Therefore, when there are new element launched in the market place, such as a control chip, a storage device (e.g., hard drive (Hard Disk Drive, HDD), a solid state drive (Solid State Drive, SSD)), a server card, a storage control card and so on, a technician replaces old modules with new ones from the storage server system and updates related software to perform system upgrade. Likewise, when there is system malfunction, the technician replaces the malfunction module to perform system repairmen. In addition, since most of modules of the storage server system can be directly removed and leave connectors, which not only reduces failure rate and also benefit for troubleshooting and debug.

Most of storage devices in the market place support transmission interfaces such as Serial Attached Small Computer System Interface (also known as Serial Attached SCSI, and abbreviated SAS) or Serial Advanced Technology Attachment (SATA). Recently, storage devices supporting Non-Volatile Memory Express (NVMe) and Peripheral Component Interconnect Express (PCIe) transmission interfaces have become more popular. Therefore, the industry defines a connector (e.g., SFF-8639) capable of supporting four transmission interfaces, which allows the storage server system compatible with storage devices for four different transmission interfaces (e.g., SAS, SATA, NVMe and PCIe transmission interfaces).

Further, the storage devices supporting different transmission interfaces have various power consumptions and load currents, and thus they require different overcurrent protection values. The required overcurrent protection value varies based on different system configurations, e.g., the storage server system includes different types and number of storage devices. The storage server system in the market place utilizes a fixed overcurrent protection value, however, which leads many problems. For example, when the technician uses a maximum tolerance value to set the overcurrent protection value of the storage server system, the overcurrent protection function cannot satisfy the requirement of the storage server system with low load current configuration, i.e., bad sensitivity to the overcurrent. Or, the storage devices supporting the NVMe and PCIe transmission interfaces have higher load currents, when the technician uses the maximum tolerance value to set the overcurrent protection value of every storage server system based on the high load current configuration, the cost of the storage server system significantly increases.

Therefore, how to provide a storage server system and related method capable of setting overcurrent protection value according to system configuration has become a topic of the industry.

SUMMARY OF THE INVENTION

It is therefore an objective of the present invention to provide a storage server system capable of setting overcurrent protection value according to system configuration.

The present invention discloses a storage server system includes a storage device module, a power source supply unit, a memory device, a microcontroller, a variable resistor, a hot swap controller and a switch. The storage device module includes at least one storage device, and configured to generate at least one present signal. The power source supply unit is configured to supply power source to the storage device module. The memory device is configured to store system information. The microcontroller is coupled to the storage device module and the memory device, and configured to generate a setting signal according to the at least one present signal and the system information to set an overcurrent protection value of the storage server system. The variable resistor is coupled to the microcontroller, wherein a resistance of the variable resistor is corresponding to the overcurrent protection value of the storage server system. The hot swap controller is coupled to the variable resistor, and configured to generate a read signal to the variable resistor to read the resistance, and generate a switch signal according to the resistance. The switch is coupled to the hot swap controller, the storage device module and the power source supply unit, and configured to connect the power source supply unit and the storage device module or disconnect the power source supply unit from the storage device module according to the switch signal.

The storage server system of the disclosure is capable of calculating the overcurrent protection value according to the at least one present signal (which indicates the type and number of the storage device) generated by the at least one storage device to generate the setting signal to the variable resistor, so as to set the resistance of the variable resistor, wherein the resistance is corresponding to the overcurrent protection value (i.e., the trigger level of overcurrent protection) of the storage server system. Therefore, the storage server system of the disclosure achieves overcurrent protection function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
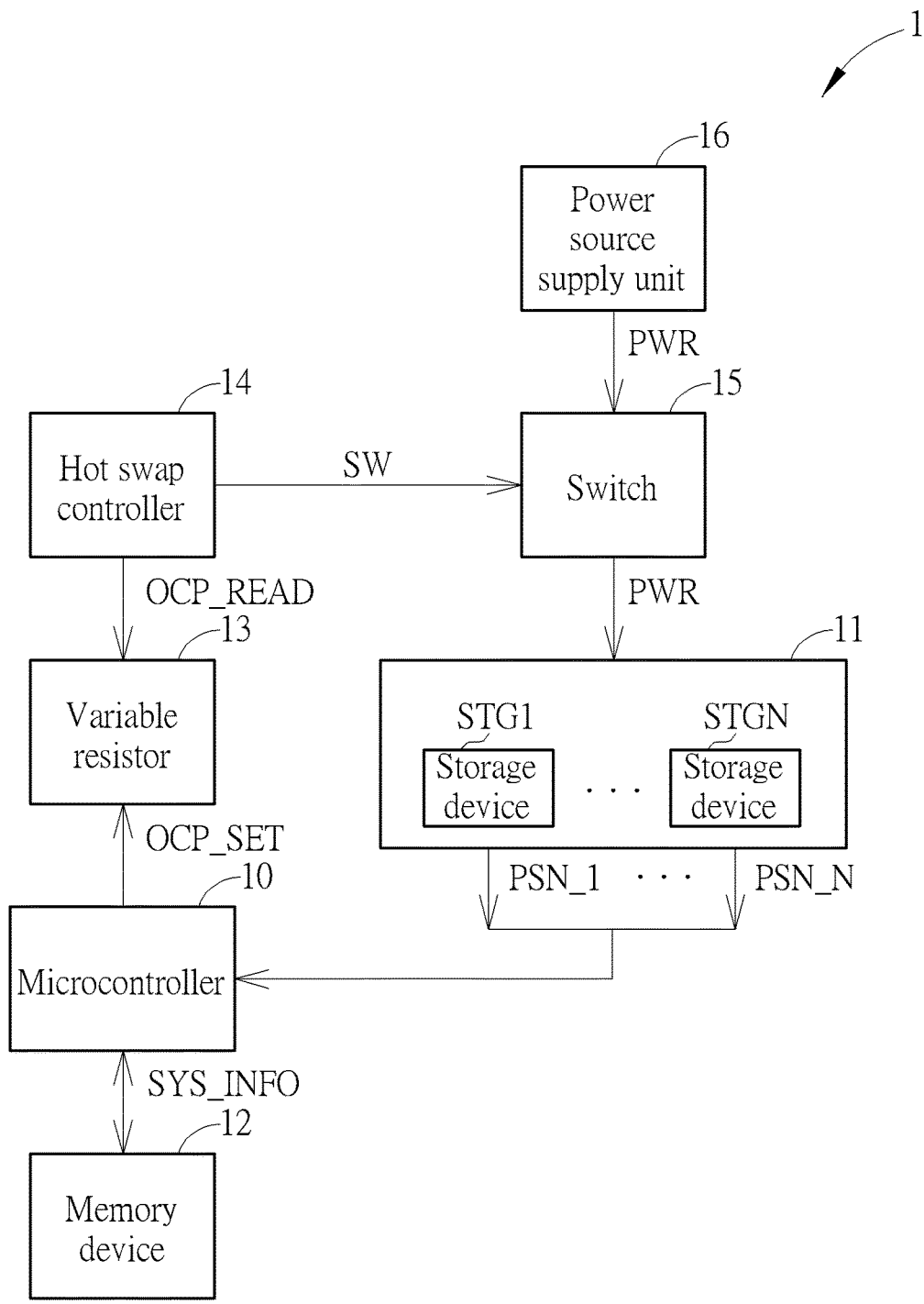
FIG. 1 is a functional block diagram of a storage server system according to an embodiment of the present invention.

FIG. 1 is a functional block diagram of a storage server system 1 according to an embodiment of the present invention. The storage server system 1 includes a microcontroller 10, a storage device module 11, a memory device 12, a variable resistor 13, a hot swap controller 14, a switch 15 and a power source supply unit 16. The storage server system 1 is used for standard open rack launched by Open Compute Project, wherein the standard open rack includes multiple power source areas corresponding to multiple storage server systems, and each of the power source areas includes a power shelf and an equipment bay (or equipment chassis). There are servers and storage boxes disposed in the equipment bay, and there is power source supply unit/power supply unit (PSU) disposed in the power shelf configured to supply a power source PWR to elements driven by the power source area.

The microcontroller 10 is coupled to the storage device module 11, the memory device 12 and the variable resistor 13, and configured to generate a setting signal OCP_SET to the variable resistor 13 according to present signals PSN_1-PSN_N and system information SYS_INFO. In one embodiment, the microcontroller 10 maybe a baseboard management controller (BMC), a programmable logic device (CPLD), a field programmable gate array (FPGA) etc., which is not limited.

The storage device module 11 is coupled to the microcontroller 10 and the switch 15, includes multiple storage devices STG1-STG_N, and configured to respectively generate the present signals PSN_1-PSN_N, wherein the present signals PSN_1-PSN_N respectively indicate number and type of the corresponding storage devices STG1-STG_N. In one embodiment, the storage devices STG1-STG_N may be a hard drive or a solid state drive, and the type of the storage device indicates one of SAS, SATA, NVMe and PCIe transmission interfaces, which is not limited.

The memory device 12 is coupled to the microcontroller 10, and configured to store the system information SYS_INFO, wherein the system information SYS_INFO indicates drive specification of the storage server system 1, e.g., an initial overcurrent protection value, a minimum tolerance value and a maximum tolerance value, and the type, transmission interface and load current of the storage device. In one embodiment, the memory device 12 maybe an Electrically-Erasable Programmable Read-Only Memory (EEPROM), which is not limited.

The variable resistor 13 is coupled to the microcontroller 10 and the hot swap controller 14, and configured to set its resistance according to the setting signal OCP_SET to set a trigger level of overcurrent protection of the storage server system 1. In one embodiment, the variable resistor 13 maybe a digital potentiometer, and includes an inter-integrated circuit bus interface, wherein the microcontroller 10 may set the resistance of the variable resistor 13 through the inter-integrated circuit bus interface.

The hot swap controller 14 is coupled to the variable resistor 13 and the switch 15, and configured to generate a switch signal SW to the switch 15 according to a read signal OCP_READ. Specifically, the hot swap controller 14 reads the resistance of the variable resistor 13 through the read signal OCP_READ to obtain the overcurrent protection value of the storage server system 1 to trigger the overcurrent protection function accordingly. The switch 15 is coupled to the storage device module 11, the hot swap controller 14 and the power source supply unit 16, and configured to connect the storage device module 11 and the power source supply unit 16 or disconnect the storage device module 11 from the power source supply unit 16 according to the switch signal SW. When the switch 15 connects the storage device module 11 and the power source supply unit 16, which means that the hot swap controller 14 does not trigger the overcurrent protection function, the power source supply unit 16 supplies the power source PWR to the storage device module 11; when the switch 15 disconnects the storage device module 11 from the power source supply unit 16, which means that the hot swap controller 14 triggers the overcurrent protection function, so the power source supply unit 16 stops supplying the power source PWR to the storage device module 11. The power source supply unit 16 is coupled to the switch 15, and configured to provide the power source PWR to the storage device module 11. In one embodiment, the power source supply unit 16 further provides power source to elements contained in the storage server system 1.

When the storage server system 1 is modular designed, the containing elements of the storage server system 1 are adjustable according to practical requirements, in general, server cards and storage control cards (not shown in FIG. 1) have a less impact to the total current of the storage server system, while the load current of the storage device module 11 has a greater impact to the total current of the storage server system. Therefore, the overcurrent protection value of the storage server system 1 is dominant by the type and number of the storage devices contained in the storage device module 11.

In operation, when the power source of the storage server system 1 is turned on, a system boot process is performed to configure parameters of the system and elements (e.g., overcurrent protection value configuration). Specifically, the microcontroller 10 calculates the overcurrent protection value according to the present signals PSN_1-PSN_N and the system information SYS_INFO to generate the setting signal OCP_SET to the variable resistor 13, so as to set resistance (i.e., the trigger level of overcurrent protection). In one embodiment, the microcontroller 10 stores the calculated overcurrent protection value in the memory device 12.

Once the system boot process is finished, the hot swap controller 14 reads the overcurrent protection value through the signal OCP_READ, and detect a current flowing through the switch 15 to determine whether there is an overcurrent. e.g., when the current flowing through the switch 15 is greater than the overcurrent protection value, the hot swap controller 14 generates the switch signal SW to the switch 15 to disconnect the storage device module 11 from the power source supply unit 16, and thus the power source supply unit 16 stops supplying the power source PWR to the storage device module 11 and the storage server system 1. Then, the storage server system 1 resupplies the power source and performs the system boot process again to reset the overcurrent protection value, and so on. As a result, the storage server system 1 calculates the proper overcurrent protection value according to the type and number of storage devices, and dynamically adjusts the overcurrent protection value to achieve overcurrent protection function.

Figure 2:
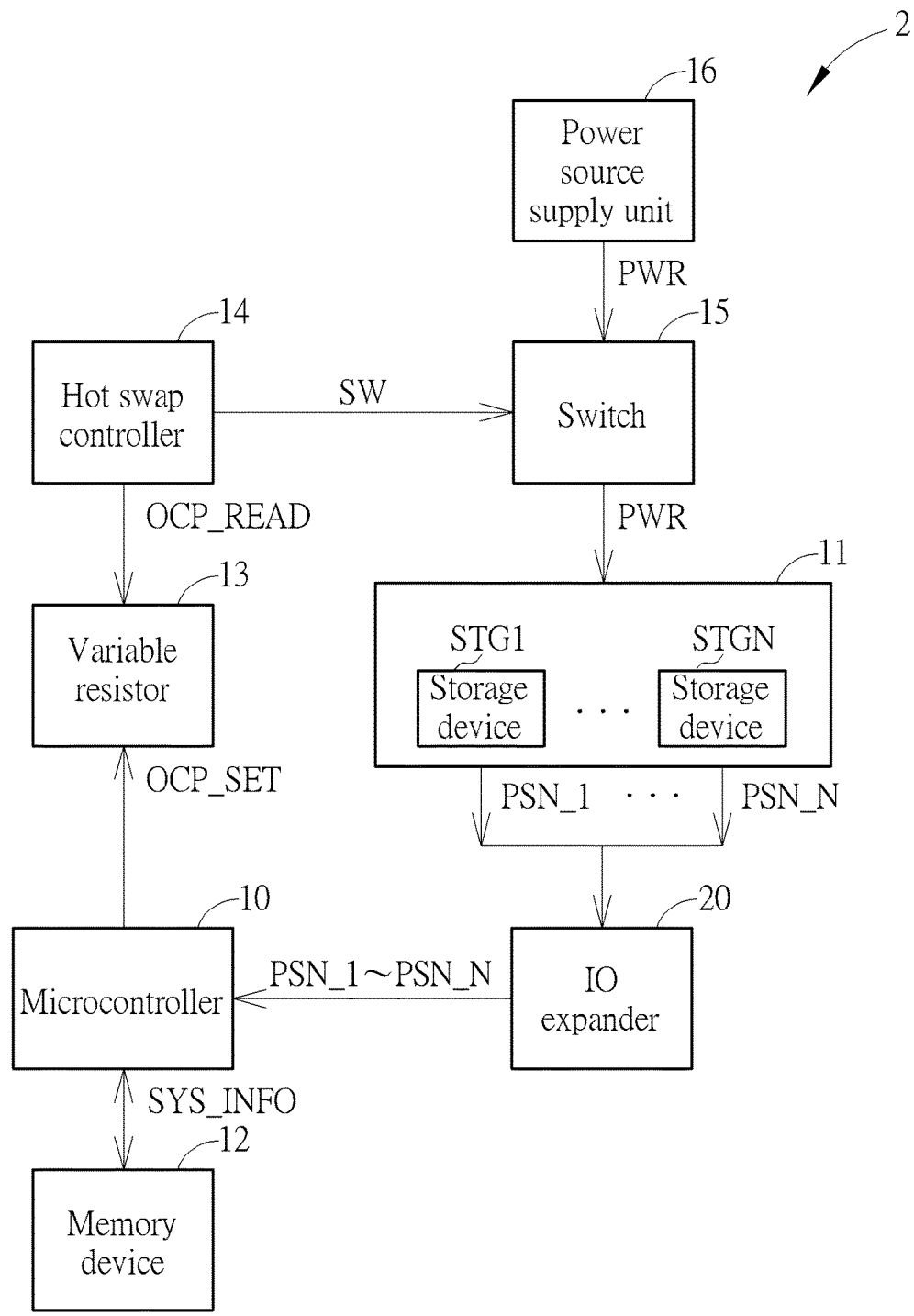
FIG. 2 is a functional block diagram of a storage server system according to another embodiment of the present invention.

FIG. 2 is a functional block diagram of a storage server system 2 according to another embodiment of the present invention. A difference between the storage server systems 1 and 2 is that the storage server system 2 further includes an IO (Input Output) expander 20, and same elements are denoted with the same symbols. The IO expander 20 is coupled between the storage device module 11 and the microcontroller 10, and configured to transmit the present signals PSN_1-PSN_N to the microcontroller 10. In other words, the microcontroller 10 reads the present signals PSN_1-PSN_N from the IO expander 20, and reads the system information SYS_INFO from the memory device 12 to calculate the overcurrent protection value accordingly.

Figure 3:
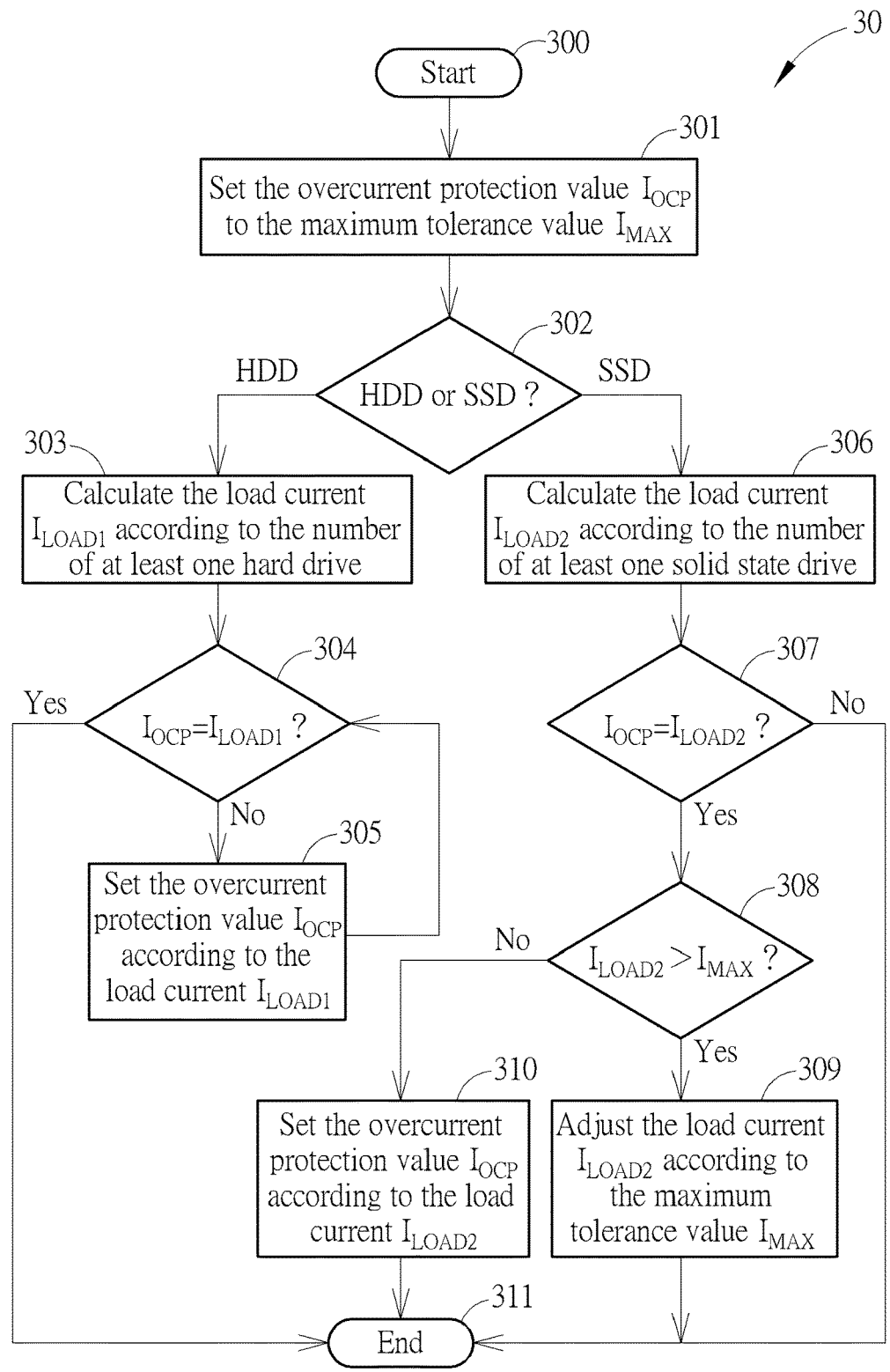
FIG. 3 is a flow chart of a process of setting overcurrent protection value according to an embodiment of the present invention.

Operations of the storage server systems 1 and 2 may be summarized into another process 30 of setting overcurrent protection value, as shown in FIG. 3. The process 30 maybe compiled into a program code and stored in the microcontroller 10 for instructing the microcontroller 10 to calculate and set the overcurrent protection value when the system power source is turned on and performing a system boot process. In this embodiment, the program code of the process 30 is stored in the microcontroller 10 since the overcurrent protection value musts be calculated before the storage device is turned on. For example, the program code of the process 30 is stored in a Read Only Memory (ROM) of the microcontroller 10, e.g., EEPROM, Flash Memory or Random Access Memory (RAM), which is not limited.

In the process 30, given that there is one type of storage device in the storage server systems 1 and 2, e.g., only the hard drive (which supports SAS and SATA transmission interfaces) or only the solid state drive (which supports SATA, PCIe and NVMe transmission interfaces). The process 30 includes the following steps.

Step 300: Start.

Step 301: Set the overcurrent protection value $I_{OCP}$ to the maximum tolerance value $I_{MAX}$.

Step 302: Determine whether storage device is a hard drive or a solid state drive. Go to Step 303 if it is a hard drive; go to Step 306 if it is a solid state drive.

Step 303: Calculate the load current $I_{LOAD1}$ according to the number of at least one hard drive.

Step 304: Determine whether the overcurrent protection value $I_{OCP}$ is equal to the load current $I_{LOAD1}$? Go to Step 311 if yes; go to Step 305 if no.

Step 305: Set the overcurrent protection value $I_{OCP}$ according to the load current $I_{LOAD1}$. Back to Step 304.

Step 306: Calculate the load current $I_{LOAD2}$ according to the number of at least one solid state drive.

Step 307: Determine whether the overcurrent protection value $I_{OCP}$ is equal to the load current $I_{LOAD2}$? Go to Step 311 if yes; go to Step 308 if no.

Step 308: Determine whether the load current $I_{LOAD2}$ is greater than the maximum tolerance value $I_{MAX}$? Go to Step 309; go to Step 310 if no.

Step 309: Adjust the load current $I_{LOAD2}$ according to the maximum tolerance value $I_{MAX}$. Go to Step 311.

Step 310: Set the overcurrent protection value $I_{OCP}$ according to the load current $I_{LOAD2}$.

Step 311: End.

According to the process 30, when the system power source is turned on, the microcontroller 10 firstly sets the overcurrent protection value to the maximum tolerance value $I_{MAX}$ (Step 301), and determines whether the storage device is the hard drive or the solid state drive (Step 302). When the storage device is the hard drive, the microcontroller 10 calculates the load current $I_{LOAD1}$ of the hard drive according to the number of hard drives (Step 303), and then determines whether the overcurrent protection value $I_{OCP}$ is equal to the load current $I_{LOAD1}$ (Step 304). When the overcurrent protection value $I_{OCP}$ is equal to the load current $I_{LOAD1}$, which means that the overcurrent protection mechanism has a proper sensitivity, and the storage device is ready to turn on (Step 311); on the other hand, when the overcurrent protection value $I_{OCP}$ is not equal to the load current $I_{LOAD1}$, which means that the overcurrent protection mechanism has a bad sensitivity, so the microcontroller 10 sets the overcurrent protection value $I_{OCP}$ according to the load current $I_{LOAD1}$ (Step 305).

On the other hand, when the storage device is the solid state drive, the microcontroller 10 calculates the load current $I_{LOAD1}$ of the solid state drive according to the number of solid state drives (Step 306), and then determines whether the overcurrent protection value $I_{OCP}$ is equal to the load current $I_{LOAD2}$ (Step 307). When the overcurrent protection value $I_{OCP}$ is equal to the load current $I_{LOAD2}$, which means that the overcurrent protection mechanism has the proper sensitivity; on the other hand, when the overcurrent protection value $I_{OCP}$ is not equal to the load current $I_{LOAD2}$, which means that the overcurrent protection mechanism has the bad sensitivity, so the microcontroller 10 determines whether the load current $I_{LOAD2}$ is greater than maximum tolerance value $I_{MAX}$ (Step 308). When the load current $I_{LOAD2}$ is greater than maximum tolerance value $I_{MAX}$, the microcontroller 10 adjusts the load current $I_{LOAD2}$ according to the maximum tolerance value $I_{MAX}$ (Step 309) to make it lower than the maximum tolerance value $I_{MAX}$ and the overcurrent protection mechanism having the proper sensitivity; on the other hand, when the load current $I_{LOAD2}$ is not greater than maximum tolerance value $I_{MAX}$, the microcontroller 10 sets the overcurrent protection value $I_{OCP}$ according to the load current $I_{LOAD2}$ (Step 310) to make the overcurrent protection mechanism having the proper sensitivity.

In general, the load current of the hard drive is fixed, while the load current of the NVMe drive is adjustable, and the maximum tolerance value $I_{MAX}$ for overcurrent of the storage server system 1 is designed based on the condition that all the connectors of the plate are connected to the hard or solid state drive. However, the load current of the NVMe drive is greater than that of the hard drive in nature, and thus the load current $I_{LOAD2}$ of the NVMe drive may be greater than the maximum tolerance value $I_{MAX}$. In such a situation, the load current $I_{LOAD2}$ should by adjusted to make the total load current of the storage server system lower than the maximum tolerance value $I_{MAX}$.

Therefore, by performing the process 30, the storage server systems 1 and 2 are capable of calculating the proper overcurrent protection value according to the type and configured number of storage devices to achieve overcurrent protection function.

Figure 4:
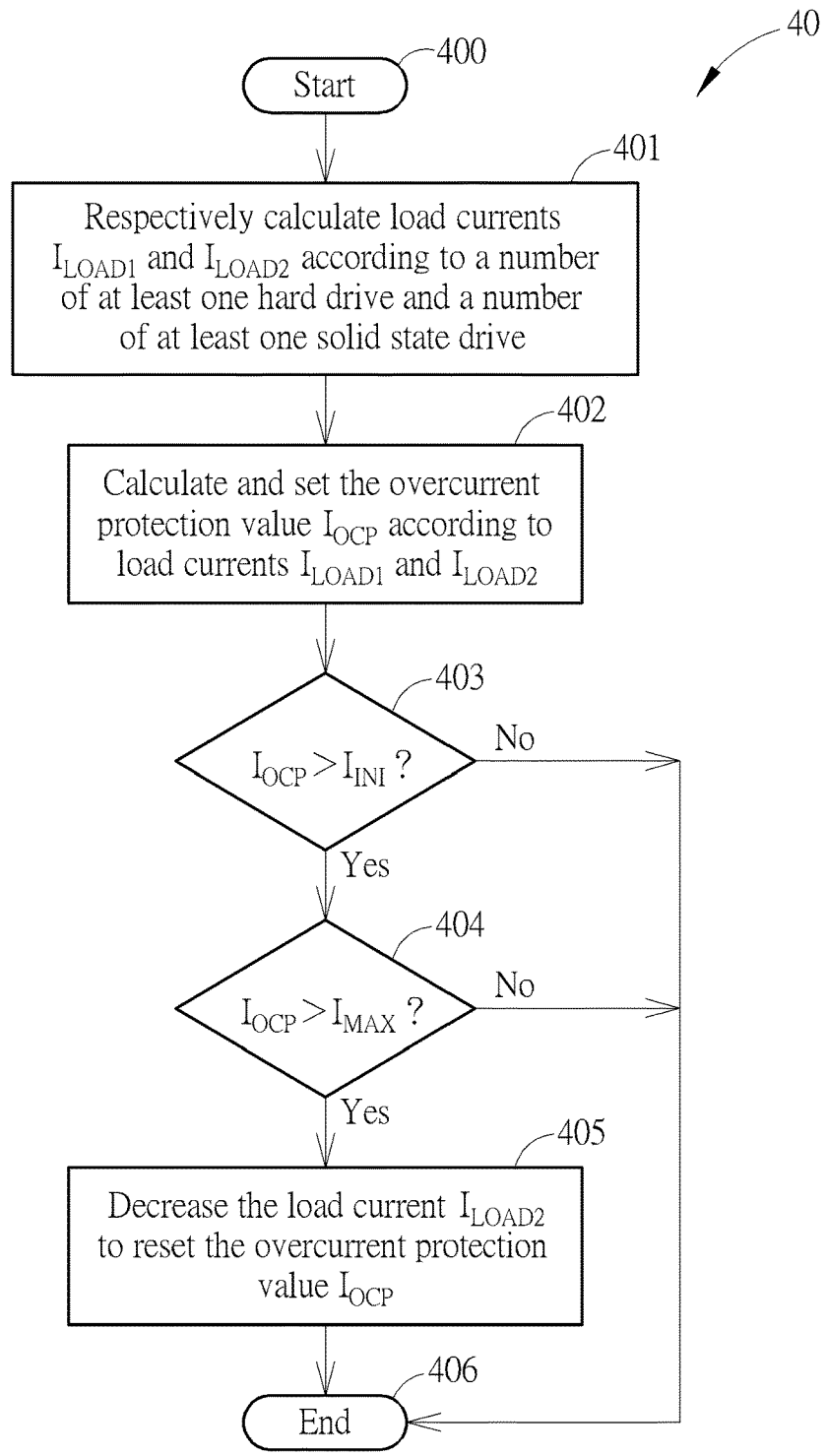
FIG. 4 is a flow chart of a process of setting overcurrent protection value according to another embodiment of the present invention.

In one embodiment, operations of the storage server systems 1 and 2 may be summarized into another process 40 of setting overcurrent protection value, as shown in FIG. 4. The process 40 may be compiled into a program code and stored in the microcontroller 10 for instructing the microcontroller 10 to calculate and set the overcurrent protection value when the system power source is turned on and performing a system boot process. In the process 40, given there are two types of storage devices included in the storage server systems 1 and 2, for example there are hard drives (which support SAS and SATA transmission interfaces) and solid state drives (which support SATA, PCIe and NVMe transmission interfaces). The process 40 includes the following steps.

Step 400: Start.

Step 401: Respectively calculate load currents $I_{LOAD1}$ and $I_{LOAD2}$ according to a number of at least one hard drive and a number of at least one solid state drive.

Step 402: Calculate and set the overcurrent protection value $I_{OCP}$ according to the load currents $I_{LOAD1}$ and $I_{LOAD2}$.

Step 403: Determine whether the overcurrent protection value $I_{OCP}$ is greater than an initial value $I_{INI}$? Go to Step 404 if yes; go to Step 406 if no.

Step 404: Determine whether the overcurrent protection value $I_{OCP}$ is greater than a maximum value $I_{MAX}$? Go to Step 405 if yes; go to Step 406 if no.

Step 405: Decrease the load current $I_{LOAD2}$ to reset the overcurrent protection value $I_{OCP}$.

Step 406: End.

According to the process 40, when the system power source is turned on, the microcontroller 10 respectively calculates the load currents $I_{LOAD1}$ and $I_{LOAD2}$ of the hard drive and the solid state drive according to the number of at least one hard drive and the at least one solid state drive (Step 401), so as to calculate and set the overcurrent protection value $I_{OCP}$ (Step 402). Then, the microcontroller 10 determines whether the overcurrent protection value $I_{OCP}$ is greater than the initial value $I_{INI}$ (Step 403). When the overcurrent protection value $I_{OCP}$ is greater than the initial value $I_{INI}$ the microcontroller 10 determines whether the overcurrent protection value $I_{OCP}$ is greater than the maximum tolerance value $I_{MAX}$ (Step 404) ; on the other hand, when the overcurrent protection value $I_{OCP}$ is not greater than the initial value $I_{INI}$, which means that the overcurrent protection value $I_{OCP}$ is set successfully and the storage device is ready for operation. When the overcurrent protection value $I_{OCP}$ is greater than the maximum tolerance value $I_{MAX}$, the microcontroller 10 decreases the load current $I_{LOAD2}$ of the solid state drive and reset the overcurrent protection value $I_{OCP}$ (Step 405). Afterwards, the microcontroller 10 again determines whether the overcurrent protection value $I_{OCP}$ is greater than the maximum tolerance value $I_{MAX}$ to ensure that the overcurrent protection function works normally.

In one embodiment, in Step 405, the microcontroller 10 gradually decreases the load current $I_{LOAD2}$ of the solid state drive, e.g., decrease the load current $I_{LOAD2}$ by one step current, to reset the overcurrent protection value $I_{OCP}$ until the overcurrent protection value $I_{OCP}$ is equal to or less than the maximum tolerance value $I_{MAX}$. However, in practice, the load current $I_{LOAD2}$ of the solid state drive shall be greater than a minimum tolerance value to ensure that the solid state drive works normally. When the load current $I_{LOAD2}$ of the solid state drive is equal to or less than the minimum tolerance value, but the overcurrent protection value $I_{OCP}$ is greater than the maximum tolerance value $I_{MAX}$, the microcontroller 10 generates a warning signal to indicate that the overcurrent protection function cannot support the current system configuration and aborts system boot process.

Therefore, by performing the process 40, the storage server systems 1 and 2 are capable of calculating the proper overcurrent protection value according to the type and configured number of storage devices to achieve overcurrent protection function.

To sum up, the storage server system of the disclosure is capable of calculating the proper overcurrent protection value according to the type and configured number of storage devices to generate the setting signal to the variable resistor for setting the resistance of the variable resistor, wherein the resistance is corresponding to the overcurrent protection value (i.e., the trigger level of the overcurrent protection) of the storage server system. Therefore, the overcurrent protection function is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage server system, comprising:
   a storage device module comprising at least one storage device, and configured to generate at least one present signal;
   a power source supply unit configured to supply power source to the storage device module;
   a memory device configured to store system information;
   a microcontroller coupled to the storage device module and the memory device, and configured to generate a setting signal according to the at least one present signal and the system information to set an overcurrent protection value of the storage server system;
   a variable resistor coupled to the microcontroller, wherein a resistance of the variable resistor is corresponding to the overcurrent protection value of the storage server system;
   a hot swap controller coupled to the variable resistor, and configured to generate a read signal to the variable resistor to read the resistance, and generate a switch signal according to the resistance; and
   a switch coupled to the hot swap controller, the storage device module and the power source supply unit, and configured to connect the power source supply unit and the storage device module or disconnect the power source supply unit from the storage device module according to the switch signal.

2. The storage server system of claim 1, wherein the microcontroller is a baseboard management controller, a programmable logic device, or a field programmable gate array (FPGA), the memory device is an Electrically-Erasable Programmable Read-Only Memory, and the variable resistor is a digital potentiometer.

3. The storage server system of claim 1, further comprising an expander, the expander is coupled between the storage device module and the microcontroller and configured to transmit the at least one present signal to the microcontroller.

4. The storage server system of claim 1, wherein when the setting signal indicates an overcurrent, the switch signal controls the switch to disconnect the storage device module from the power source supply unit; and when the setting signal indicates no overcurrent, the switch signal controls the power source supply unit to connect the supply power source and the storage device module.

5. The storage server system of claim 1, wherein the at least one present signal respectively indicates a type and a number of the at least one storage device, and the system information indicates an initial overcurrent protection value and a maximum tolerance value of the storage server system.

6. The storage server system of claim 5, wherein the at least one storage device is at least one hard drive or at least one solid state drive, and the type of the storage device indicates one of Serial Attached Small Computer System Interface, Serial Advanced Technology Attachment interface, Non-Volatile Memory Express interface and Peripheral Component Interconnect Express interface.

7. The storage server system of claim 6, wherein the microcontroller is further configured to store a program code, the program code instructs the microcontroller to execute a process of setting the overcurrent protection value to generate the setting signal when the storage server system is power on and performing a system boot process, wherein the process comprises:
- setting the overcurrent protection value to the maximum tolerance value;
- determine whether the at least one storage device is the at least one hard drive or the at least one solid state drive according to the at least one present signal;
- calculating a first load current according to the number of the at least one hard drive when the at least one storage device is the at least one hard drive;
- determining whether the overcurrent protection value is equal to the first load current;
- keeping the overcurrent protection value to be the maximum tolerance value when the overcurrent protection value is equal to the first load current; and
- when the overcurrent protection value is not equal to the first load current, set the overcurrent protection value according to the first load current.

8. The storage server system of claim 7, wherein the process further comprises:
- calculating a second load current according to the number of the at least one solid state drive when the at least one storage device is the at least one solid state drive;
- determining whether the overcurrent protection value is equal to the second load current;
- keeping the overcurrent protection value to be the maximum tolerance value when the overcurrent protection value is equal to the second load current; and
- adjusting the second load current according to the maximum tolerance value when the overcurrent protection value is not equal to the second load current to set the overcurrent protection value according to the second load current.

9. The storage server system of claim 8, wherein the at least one storage device comprises at least one hard drive and at least one solid state drive, and the type of the storage device indicates one of Serial Attached Small Computer System Interface, Serial Advanced Technology Attachment interface, Non-Volatile Memory Express interface and Peripheral Component Interconnect Express interface.

10. The storage server system of claim 9, wherein the microcontroller is further configured to store a program code, the program code instructs the microcontroller to execute a process of setting the overcurrent protection value to generate the setting signal when the system power source is turned on and performing a system boot process, wherein the process comprises:
- calculating the number of the at least one hard drive and the number of the at least one solid state drive according to the at least one present signal to respectively calculate a first load current and a second load current;
- calculating and set the overcurrent protection value according to the first load current and the second load current;
- determining whether the overcurrent protection value is greater than the initial value; and
- decreasing the second load current when the overcurrent protection value is greater than the initial value to reset the overcurrent protection value.

* * * * *